United States Patent [19]

Kotzian

[11] Patent Number: 5,014,013

[45] Date of Patent: May 7, 1991

[54] ANTILOG CIRCUIT WITH AUTOMATIC GAIN CONTROL

[75] Inventor: Brian R. Kotzian, Santa Rosa, Calif.

[73] Assignee: Hewlett-Packart Company, Palo Alto, Calif.

[21] Appl. No.: 418,295

[22] Filed: Oct. 6, 1989

[51] Int. Cl.[5] .......................... G06G 7/24; G06G 7/16; G06F 7/556; G06F 1/02

[52] U.S. Cl. ...................................... 328/145; 307/492

[58] Field of Search ................ 328/145, 142; 307/492, 307/359; 364/851, 857, 718, 722

[56] References Cited

U.S. PATENT DOCUMENTS 3,518,578 6/1970 Oppenheim et al. ............... 328/145

4,568,978 2/1986 Cosh ................................... 328/145

*Primary Examiner*—Stanley D. Miller

*Assistant Examiner*—Nam Nguyen

*Attorney, Agent, or Firm*—William C. Milks, III

[57] ABSTRACT

A circuit for converting a log signal to a linear signal wherein automatic gain control is performed before the signal is linearized. The circuit includes a bipolar transistor connected to use its diode characteristic for converting a log signal to a linear signal, and a fixed gain linear amplifier to provide the necessary gain/bandwidth product reguired for the circuit. The circuit additionally includes a peak detection circuit that detects the peak voltage output from the linear amplifier and supplies this voltage to an integrator. The circuit determines the peak voltage of the output signal and generates an error voltage when the peak voltage exceeds a reference voltage. The error voltage is summed into the base of the transistor that performs the logarithmic-to-linear conversion function. The need for a variable gain stage in the linear amplifier is eliminated. In addition, the circuit eliminates the DC component of the input signal and produces a linear AC output signal that is controlled to a predetermined maximum amplitude. The antilog circuit is preferably connected to the output of a log amplifier and provides an AC output signal that is linear function of the modulation on the input to the log amplifier.

20 Claims, 3 Drawing Sheets

ANTILOG CIRCUIT WITH AUTOMATIC GAIN CONTROL

FIELD OF THE INVENTION

The present invention relates generally to circuits which perform an antilog function on a signal. More particularly, the present invention relates to an antilog circuit that includes automatic gain control circuitry which makes the AC output signal independent of a DC level at its input. When the output of a log amplifier is supplied to its input, the antilog circuit provides a linear video output of the AC component of the input signal.

DISCUSSION OF THE PRIOR ART

In instruments such as spectrum analyzers, circuitry is provided that allows a user to scan across a wide range of frequencies. The frequency characteristics of a signal can then be analyzed and displayed on a display device such as a cathode ray tube so that the operator can obtain a visual representation of the frequency spectrum of the signal. Since spectrum analyzers generally have a very large dynamic range over which they can operated and because of the characteristics of the signals being analyzed, logarithmic (log) amplifier circuits having a logarithmic response to the input signal are frequently used. The log amplifier response characteristic, which compresses the dynamic range of the input signal, is appropriate for analyzing a variety of signals, such as audio and video signals.

In addition to the log amplifier section, there is also a need for a linear amplifier section to provide basic demodulated amplitude information. The linear amplifier section is used, for example, to provide broadcast/communication audio to a speaker, composite video to a video monitor, or time domain pulse envelope signals to an oscilloscope.

Spectrum analyzers of the prior art generally used two completely separate hardware circuit paths in order to provide separate linear signal outputs and logarithmic signal outputs. This prior art implementation required a series-connected chain of log amplifier stages and a series-connected chain of linear amplifier stages. Either chain of amplifiers could be switched into the intermediate frequency amplification stage to provide a signal for the modulation detector. One problem with this prior art implementation is that the spectrum analyzer must include two separate, independent, complete hardware circuit paths, one for the log amplifier circuit, and one for the linear amplifier circuit. This implementation uses a large number of circuit components, such as amplifier, and additionally uses a large amount of printed circuit board space within the spectrum analyzer.

Another problem with this prior art implementation is that the different amplifier chains must be switched into and out of the intermediate frequency circuit path. This requires periodic adjustment of the gains of the two separate amplifier circuits.

In recent years, the implementation using two separate amplifier circuits has been replaced by a combination of hardware and computer software. The spectrum analyzer circuitry still includes a complete log amplifier chain and modulation detector. However, the linear amplifier chain has been eliminated, and a computer program calculates a value that represents the amplitude of the uncompressed input signal. The system then displays the software-generated value on the operator's cathode ray tube. This implementation suffers from the limitation that the analog voltage is not available anywhere in the system to provide a demodulated linear output signal to drive an external device such as a speaker if the signal is audio or a video monitor if the signal is video.

Therefore, an object of the present invention is to provide and antilog circuit that provides a linear amplitude signal from a logarithmic signal.

Another object of the present invention is to provide an antilog circuit that saves printed circuit board space by not requiring a linear amplifier in parallel with a log amplifier.

Another object of the present invention is to provide an antilog circuit with automatic gain control that regulates the linear output signal to a maximum voltage.

Another object of the present invention is to reduce the dynamic range requirements of the antilog circuit by eliminating the DC component of the signal from the logarithmic amplifier output.

Another object of the present invention is to provide an antilog circuit with automatic gain control that eliminates the need for a variable gain stage in the linear amplifier portion of the circuit.

Yet another object of the present invention is to provide an antilog apparatus with automatic gain control to maintain the circuit at a constant operating point, thereby substantially reducing the amount of temperature compensation circuitry necessary.

Still another object of the invention is to provide an amplifier system having a logarithmic output signal and linear output signal without requiring separate log and linear amplifier chains.

SUMMARY OF THE INVENTION

The foregoing and other objects and advantages of the present invention are achieved in an antilog circuit wherein automatic gain control is performed before the signal is linearized. The circuit includes antilog means, such as a bipolar transistor arranged to use its diode characteristic, for converting a logarithmic signal to a linear signal, and a fixed gain linear amplifier. The circuit additionally includes a peak detection circuit that detects the peak voltage output from the amplifier and supplies this voltage to an inverting integrator. Different integrator time constants for the positive and the negative voltage swings of the linear output signal allow the circuit to determine the peak voltage of the output signal. An error voltage representative of the peak voltage is generated when the output voltage exceeds a reference voltage. The error voltage is summed into the base of the transistor that is performing the logarithmic-to-linear conversion function and effectively controls the gain of the circuit. The need for a variable gain stage in the linear amplifier portion of the amplifier is eliminated since, in the log domain, addition is equivalent to multiplication. In addition, the circuit eliminates the DC component of the input logarithmic voltage and produces a linear voltage output that is controlled to a predetermined maximum amplitude.

The antilog circuit is preferably used in conjunction with a log amplifier. A log signal output from the log amplifier is connected to the input of the antilog circuit. The output of the antilog circuit has a linear relationship to the input of the log amplifier.

The foregoing and other objects, features, and advantages of the present invention will be more readily understood and apparent from the following detailed description of the invention, which should be read in conjunction with the accompanying drawings and from the claims which are appended at the end of the detailed description.

BRIEF DESCRIPTION OF THE DRAWINGS

For a better understanding of the present invention together with other and further objects, advantages and capabilities thereof, reference is made to the accompaying drawings which are incorporated herein by reference and in which.

DETAILED DESCRIPTION

For purposes of illustration only, and not to limit generality, the present invention will now be explained with reference to its use in the intermediate frequency stage of a spectrum analyzer. However, one skilled in the art will recognize that the features and functions of the present invention are useful in applications other than spectrum analyzers.

Figure 1:
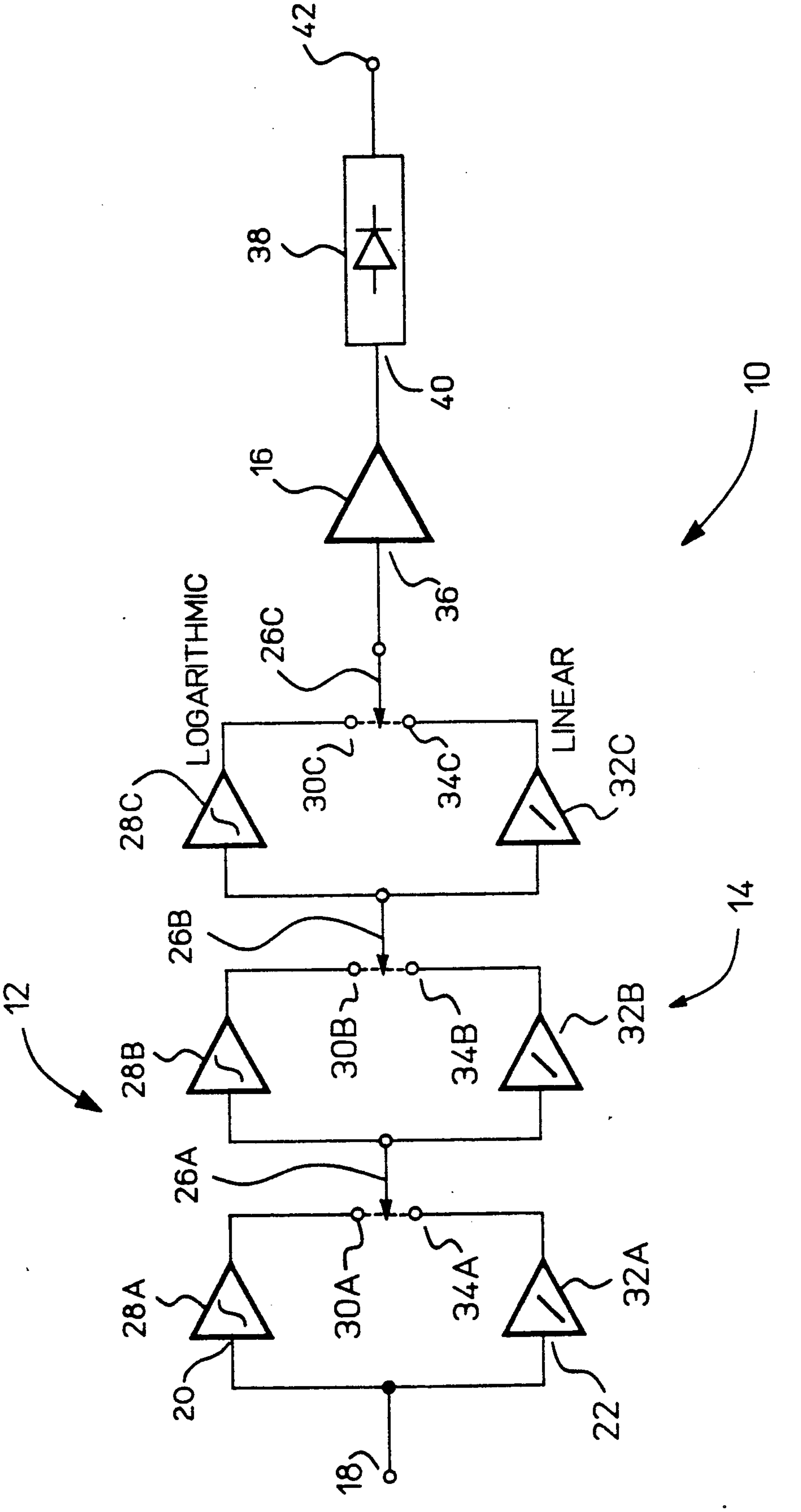
FIG 1 (PRIOR ART)
FIG. 1 is a schematic block diagram of a prior art intermediate frequency amplification stage using separate and independent logarithmic amplifier chains and linear amplifier chains.

With reference to FIG. 1, there is shown a schematic block diagram of a prior art implementation of a circuit for supplying both logarithmic and linear voltage outputs. Circuit 10 includes a logarithmic amplifier circuit chain 12 and a linear amplifier circuit chain 14. The input signal to circuit 10, which in the illustrated circuit is an intermediate frequency signal in a spectrum analyzer, is applied to node 18 and is simultaneously connected to the input of the logarithmic amplifier chain at input terminal 20 and to the input of the linear amplifier chain at input terminal 22. Switches 26A through 26C are used to select the type of circuit function, either logarithmic amplification or linear amplification. When logarithmic amplification is selected, contacts 26A, 26B and 26C are simultaneously switched to connect the inputs and outputs of logarithmic amplifier 28A, 28B, and 28C in series. This is accomplished by simultaneously switching contact 26A to the output of logarithmic amplifier 28A at terminal 30A, switching contact 26B to the output of logarithmic amplifier 28B at terminal 30B, and switching contact 26C to the output of logarithmic amplifier 28C at terminal 30C.

If a linear signal output is desired, contact 26A is switched to the output of linear output amplifier 32A at terminal 34A, contact 26B is switched to the output of linear output amplifier 32B at terminal 34B, and contact 26C is switched to the output of linear output 32C at terminal 34C. It will be appreciated that there are as many amplifier stages connected in series as are required to achieve the desired gain for the intermediate frequency amplifier.

The output of either the logarithmic amplifier chain 12 or the linear amplifier chain 14 is connected to the input 36 of an amplifier 16. Amplifier 16 is used to amplify the signal supplied by either logarithmic amplifier chain 12 or linear amplifier chain 14. The output of amplifier 16 is connected to the input of an envelope detector 38 at terminal 40. Finally, the output of the envelope detector 38 is available at output terminal 42.

Figure 2:
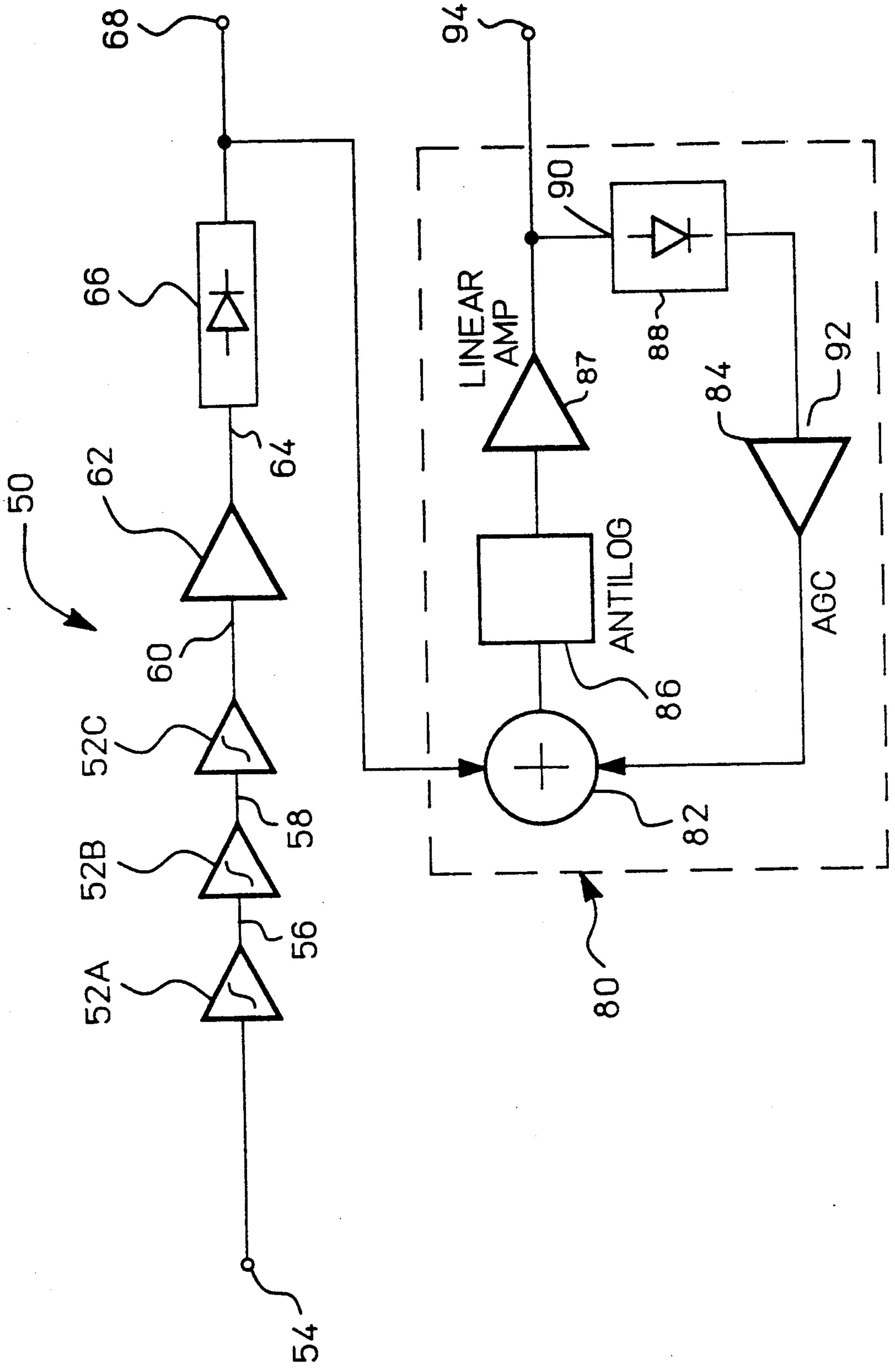
FIG. 2 is a schematic block diagram illustrating the apparatus of the present invention in an intermediate frequency assembly.

Referring now to FIG. 2, the apparatus of the present invention is shown in schematic block diagram form as part of the intermediate frequency amplifier in a spectrum analyzer. FIG. 2 shows circuit 50 which includes logarithmic amplifier stages 52A, 52B, and 52C. The intermediate frequency signal is connected to the input 54 of logarithmic amplifier stage 52A. The output of logarithmic amplifier stage 52A is connected to the input terminal 56 of logarithmic amplifier stage 52B. The output of logarithmic amplifier stage 52B is connected to the input terminal 58 of logarithmic amplifier stage 52C. Although only three stages of amplification have been shown in FIG. 5, it will be appreciated by one skilled in the art that as many stages of amplification can be connected in series as is necessary in order to achieve the desired gain for the system.

The output of logarithmic amplifier stage 52C is connected to the input terminal 60 of amplifier 62. The output of amplifier 62 is connected to the input terminal 64 of envelope detector 66. The function of envelope detector 66, which is illustratively shown as a diode detector, is to demodulate the information or video signal from the intermediate frequency signal. A demodulated, baseband logarithmic signal is available at output terminal 68 of detector 66. A suitable logarithmic amplifier including logarithmic amplifier stages 52A, 52B, 52C, amplifier 62 and detector 66 is utilized in the Model 70903A manufactured and sold by Hewlett-Packard Company.

In accordance with the invention, from output terminal 68, the baseband logarithmic signal is also connected to antilog circuit 80. The functions performed by circuit 80 are shown in schematic block diagram form in FIG. 2. Circuit 80 includes a summing circuit 82 which combines the logarithmic signal from output terminal 68 with an automatic gain correction error signal from an integrator 84. The output of the summing circuit 82 is connected to the input of an antilog device 86. The output of the antilog device 86 is connected to an input of a linear amplifier 87. The output of linear amplifier 87 is connected to an input teminal 90 of a peak detector 88 shown illustratively as a diode detector. The output of peak detector 88 is connected to an input terminal 92 of inverting integrator circuit 84. A linear output signal, with the DC component removed, is provided at an output terminal 94. The output signal can be used as the input signal for a speaker if the signal is an audio signal, a video monitor if the signal is a video signal, or the signal can be connected to an oscilloscope or a pulse analyzer for monitoring purposes.

Circuit 80 shown in FIG. 2 provides a simplified automatic gain control design because the output of automatic gain control circuit 84 is combined with the logarithmic signal from envelope detector 66 by summing circuit 82. The automatic gain control is performed while the signal is still in the logarithmic domain. Since addition in the logarithmic domain is equivalent to multiplication, summing circuit 82 provides gain control, and the need for a variable gain stage following antilog device 86 is eliminated.

Circuit 80 of FIG. 2 is not required to have a large dynamic range. Since the automatic gain control circuit 84 has its output connected to summing circuit 82, which is operating in the logarithmic domain, the logarithmic signal is in effect being gain controlled. As a result, the circuit 80 provides an amplitude-controlled linear AC output signal which is independent of the intermediate frequency stage gain settings.

Circuit 80 also requires minimal temperature compensation because the automatic gain control circuit maintains the antilog circuit at a substantially constant operating point.

Figure 3:
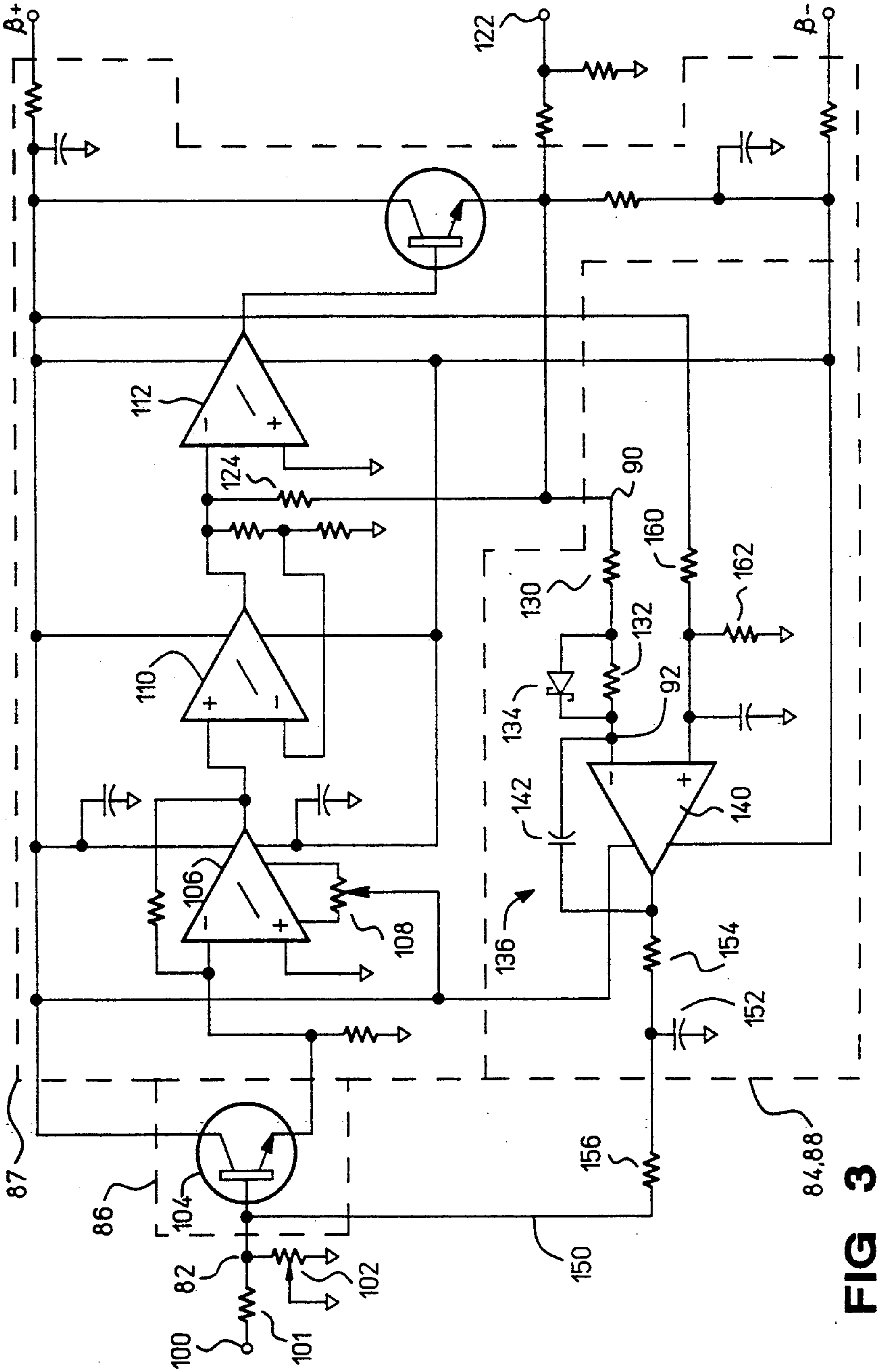
FIG. 3 is an illustrative schematic diagram of a circuit which may be used to perform the functions illustrated in FIG. 2.

FIG. 3 shows an illustrative schematic diagram of a circuit which can be used to implement circuit 80 shown in FIG. 2. The circuit of FIG. 3 receives the baseband log signal from output terminal 68 of envelope detector 66 and linearizes and amplifies this signal. The peak voltage of the linearized signal is detected and integrated to generate an error voltage which is then used to control the linear signal output amplitude.

The baseband logarithmic signal from output terminal 68 is connected to an input terminal 100. A potentiometer 102 provides a gain adjustment for the circuit. The voltage applied at the input terminal 100 is connected to the base of a bipolar transistor 104 through a resistor 101. Up to this point in the circuit, the signal is still in the logarithmic domain.

A characteristic of bipolar transistors is that the output current at the emitter is an exponential function of the input voltage at the base. Therefore, the emitter current of transistor 104 has an exponential or antilog relationship to the voltage applied at the base of transistor 104. The emitter of transistor 104 is connected to the inverting input of an amplifier 106. Amplifier 106 (which may be of the type HA2525) is connected as an inverting operational amplifier. A potentiometer 108 is used to control the input offset voltage of amplifier 106.

The output of inverting amplifier 106 is applied to the non-inverting input of an amplifier 110 (which may also be an HA2525). The output of non-inverting amplifier 110 is connected to the inverting input of an amplifier 112 (which may also be an HA2525).

Since amplifiers 106 and 112 are inverting amplifiers and amplifier 110 is a non-inverting amplifier, the signal at the output of amplifier 112 has the same phase as the signal at the input of amplifier 106. Three amplifiers are used in series in order to give the desired gain and bandwidth. The amplification stages illustrated in FIG. 3 have a bandwidth that exceeds one megahertz.

The output of amplifier 112 is connected to the base of an output transistor 120. Output transistor 120 is connected as an emitter follower to provide current to drive an external load connected to an output terminal 122 which is connected to output terminal 94 in FIG. 2. The signal at terminal 122 is a demodulated linear voltage held to a maximum voltage, such as one volt peak output, by the automatic gain control circuit which will now be explained in more detail.

The output voltage at the emitter of transistor 120 is connected to a feedback resistor 124 which controls the gain of operational amplifier 112. The emitter of transistor 120 is also connected to a resistor 130. Resistor 130 is in turn connected in series with the parallel connection of a Schottky diode 134 and a resistor 132. Resistors 130, 132, and Schottky diode 134 together form a peak detector circuit. The output of the peak detector is applied to an inverting integrator 136. Inverting integrator 136 includes an operational amplifier 140 (which may be, for example, an HA2525) and an integrating capacitor 142.

On the positive swing of the output voltage at the emitter of transistor 120, resistor 132 is effectively bypassed by the forward-biased Schottky diode 134. Therefore, the integration time for the integrator 136 is established by resistor 130 and capacitor 142. Resistor 132 is typically several thousand times larger than resistor 130.

On the negative swing of the signal at the output of transistor 120, diode 134 is reverse-biased, and resistors 130 and 132 are included in the circuit. Therefore, the time constant to discharge capacitor 142 is extremely large, since resistor 132 is several thousand times larger than resistor 130. The different time constants for the circuit on the positive and negative swings of the output voltage allow integrating capacitor 142 to remain effectively charged to the peak output voltage appearing at the emitter of transistor 120. When used in the intermediate frequency stage of a spectrum analyzer, the time constants of the peak detector can, for example, be 100 microseconds for the positive voltage swing and 500 milliseconds for the negative voltage swing.

A one volt reference is provided to the non-inverting input of inverting integrator 136 by a voltage divider that includes resistors 160 and 162. Inverting integrator 136 thus generates an error voltage when the output signal amplitude exceeds one volt. The error voltage is summed into the voltage applied to the base of transistor 104 via connection 150 after passing through a low pass filter including a capacitor 152 and resistor 154. The net result is to limit the output signal amplitude to a maximum of one volt.

This circuit has a number of advantages. First, a linear amplifier with a variable gain stage is not required because the gain control signal is summed with the input signal in the logarithmic domain. Since addition in the logarithmic domain is equivalent to multiplication in the linear domain, gain control is accomplished by summing the logarithmic input signal and the error signal at the base of transistor 104 before the logarithmic signal is processed by the antilog device. Second, the peak detection and integrator circuits effectively eliminate any DC component of the incoming signal so that the AC signal is held to a one volt peak level for any incoming voltage amplitude. Consequently, the circuit does not require as large a dynamic range as a linear amplifier circuit would usually require and also makes the recovered modulation signal independent of the intermediate frequency stage amplifier gain settings.

Having thus described one particular embodiment of the invention, various alterations, modifications, and improvements will readily occur to those skilled in the art. Such alterations, modifications, and improvements as are made obvious by this disclosure are intended to be part of this disclosure though not expressly stated herein, and are intended to be within the spirit and scope of the invention. For example, one skilled in the art will realize that the linearizing circuit of the present invention will have application in electronic devices other than spectrum analyzers. Accordingly, the foregoing description is by way of example only and is not intended as limiting. The invention is limited only as defined in the following claims and equivalents thereto.

What is claimed is:

1. An antilog circuit comprising:

antilog means for converting a first signal to a second signal such that said second signal is an exponential function of said first signal;

amplifier means for amplifying said second signal to provide an output signal;

feedback means for detecting the peak amplitude of said output signal and providing an error signal when said peak amplitude exceeds a reference voltage; and means for summing an input signal and said error signal to provide said first signal to said antilog means.

2. An antilog circuit as defined in claim 1 wherein said antilog means comprises a bipolar transistor and wherein said first signal is a voltage applied to a base of said bipolar transistor and said second signal is an emitter current of said bipolar transistor.

3. An antilog circuit as defined in claim 1 wherein said feedback means comprises a peak detector for detecting said peak amplitude and means for comparing said peak amplitude with said reference voltage.

4. An antilog circuit as defined in claim 1 wherein said feedback means comprises an integrator having an integrator capacitor and means for charging said integrator capacitor during only one polarity of said output signal.

5. An antilog circuit as defined in claim 4 wherein said integrator includes an operational amplifier having inverting and non-inverting inputs, said reference voltage being connected to said non-inverting input.

6. An antilog circuit as defined in claim 2 wherein said input signal and said error signal are summed together prior to said antilog means, whereby said error signal effects automatic gain control.

7. An amplifier system comprising:

log amplifier means for converting a high frequency input signal having modulation components and an average amplitude level to a second signal which is a log function of said high frequency input signal;

detector means for providing a log video signal in response to said second signal; and antilog circuit means for converting the modulation components of said log video signal to a linear output signal which is an exponential function of said log video signal and a linear function of said high frequency input signal and which is independent of the average amplitude level of said high frequency input signal.

8. An amplifier system as defined in claim 7 wherein said antilog circuit means includes means for automatic gain control.

9. An amplifier system as defined in claim 8 wherein said means for automatic gain control includes means for summing an error signal with said log video signal prior to conversion of said log video signal to said linear output signal.

10. An amplifier system as defined in claim 9 wherein said means for automatic gain control includes feedback means for detecting the peak amplitude of said linear output signal and providing said error signal when said peak amplitude exceeds a reference voltage.

11. An amplifier system as defined in claim 7 wherein said antilog circuit means comprises antilog means for converting a first signal to a second signal such that said second signal is an exponential function of said first signal;

amplifier means for amplifying said second signal to provide said output signal;

feedback means for detecting the peak amplitude of said output signal and providing an error signal when said peak amplitude exceeds a reference voltage; and means for summing said log video signal and said error signal to provide said first signal to said antilog means.

12. An amplifier system as defined in claim 11 wherein said antilog means comprises a bipolar transistor and wherein said first signal is a voltage applied to a base of said bipolar transistor and said second signal is an emitter current of said bipolar transistor.

13. An amplifier system as defined in claim 11 wherein said feedback means comprises a peak detector for detecting said peak amplitude and means for comparing said peak amplitude with said reference voltage.

14. An amplifier system as defined in claim 11 wherein said feedback means comprises an integrator having an integrator capacitor and means for charging said integrator capacitor during only one polarity of said output signal.

15. An amplifier system as defined in claim 14 wherein said integrator includes an operational amplifier having inverting and non-inverting inputs, said reference voltage being connected to said non-inverting input.

16. An antilog circuit comprising:

antilog means for converting a first signal to an output signal which is an exponential function of said first signal;

gain control means for detecting the peak amplitude of said output signal and providing an error signal when said peak amplitude exceeds a reference value; and means for summing an input signal and said error signal to provide said first signal to said antilog means.

17. An antilog circuit as defined in claim 16 wherein said antilog means comprises a bipolar transistor and wherein said first signal is a voltage applied to a base of said bipolar transistor and said output signal is responsive to an emitter current of said bipolar transistor.

18. An antilog circuit as defined in claim 16 wherein said gain control means comprises a peak detector for detecting said peak amplitude and means for comparing said peak amplitude with said reference value.

19. An antilog circuit as defined in claim 16 wherein said gain control means comprises an integrator having an integrator capacitor and means for charging said integrator capacitor during only one polarity of said output signal.

20. An amplifier system comprising:

log amplifier means for converting a high frequency input signal having modulation components and an average amplitude level to a second signal which is a log function of said high frequency input signal; and antilog circuit means for converting the modulation components of said second signal to a linear output signal which is an exponential function of said second signal and a linear function of said high frequency input signal and which is independent of the average amplitude level of said high frequency input signal.

* * * * *